April 14, 1942.   H. L. COOKE   2,279,446
RELIEF MAP
Original Filed Oct. 8, 1930

INVENTOR
HEREWARD LESTER COOKE.
BY
Moses + Nolte.
ATTORNEYS

Patented Apr. 14, 1942

2,279,446

UNITED STATES PATENT OFFICE 2,279,446

RELIEF MAP

Hereward Lester Cooke, Princeton, N. J., assignor to Aero Survey Corporation, a corporation of Delaware Original application October 8, 1930, Serial No. 487,175. Divided and this application November 19, 1934, Serial No. 753,597

7 Claims. (Cl. 35—41)

This invention relates to relief maps and has for an object to provide a relief map depicting the topography of the territory and having a photograph of the territory appearing on its surface.

The present application is a division of my pending application Serial No. 487,175, filed October 8, 1930, for Method and apparatus for constructing multiple scale representations of objects (now U. S. Patent No. 1,980,981). In said application the claims are directed to a novel method of making relief maps and applying of photographic reproductions thereto, while the present application is directed to the finished map.

In the drawing forming part of this specification,

Figure 1:
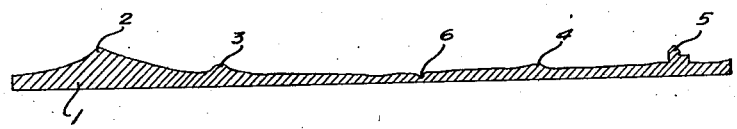
Figure 1 is a view in sectional elevation of a relief map depicting the contour or topography of the country simulated in the map.
Figure 2:
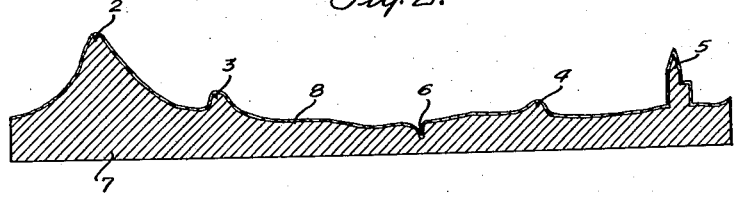
Figure 2 is a section of a relief map representing such territory, the vertical dimensions being exaggerated with reference to the horizontal dimensions.
Figure 3:
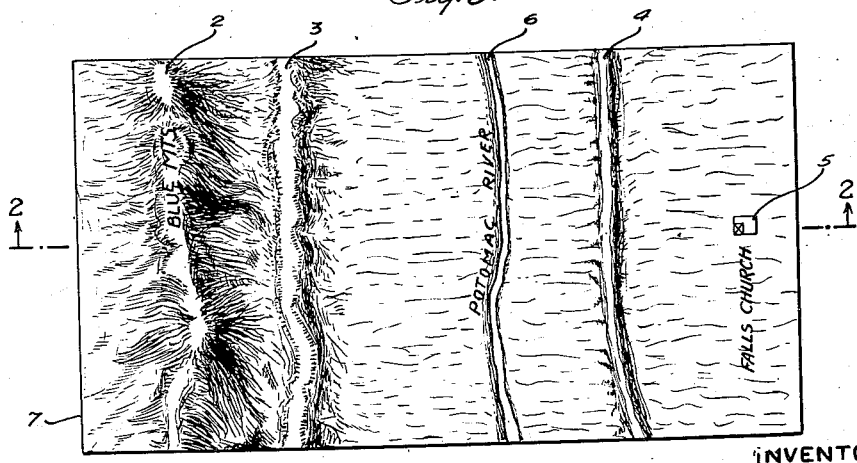
Figure 3 is a diagrammatic plan view of the finished map, it being assumed that the showing represents a photographic reproduction of the country with legends added.

Figures 1 and 2 may be regarded as taken upon the line 2—2 of Figure 3 looking in the direction of the arrows.

In my U. S. Patent No. 1,980,981 referred to above, disclosure is made of a method of producing a relief map which involves the taking of pictures of the same territory from different points in the air, the projecting of said pictures simultaneously upon a moldable or plastic material such as plaster of Paris or wax, of which the map is to be made, and sculpturing the map with the pictures thus projected upon it. The method of providing a map which accurately simulates the topography of the country is unimportant so long as the map accurately depicts the territory to be simulated, but the method described in my pending application is regarded as the most convenient, efficient and accurate method of securing that result and its use is therefore contemplated.

It is characteristic of the relief models or maps of my invention in their preferred embodiment that the relief is of uniform accuracy throughout its entire surface, and not merely at spaced zones or specified intervals as is true of all representations of terrain heretofore made either in flap map form or in relief. The ordinary contour map has the contour lines spaced thereon at regular intervals and, assuming that the map has been properly made, the elevations along the contour lines are accurate. No attempt however is made to show form of terrain between adjacent contour lines. The same is true of those relief maps heretofore made in which some degree of accuracy has been attempted, such reliefs being prepared from contour maps and being made as accurate as possible at the contour intervals. The relief is thus divided into a plurality of horizontal zones each of which is more or less accurate at the contour interval, but in which no attempt is made to represent the true surface of the terrain between the contour planes. Ordinarily maps of this character are merely smoothed over so as to give a continuous surface or curve between contour levels, but this curve does not take into account the actual surface of the terrain and may at times be very inaccurate. In accordance with the preferred form of my invention, on the contrary, reliefs are carved so as to coincide at all points and levels with an optical stereoscopic image formed by a pair of photographs. The carving thus can follow the image at all points. Therefore a true representation of the entire surface is formed, not a representation that is more or less accurate at spaced intervals but merely interploated between such intervals. My invention therefore provides a means of representing a true surface of terrain with a degree of completeness and accuracy never before obtained by any map or relief.

As illustrated in Figure 1, such a map I may represent ridges or humps 2, 3 and 4, a building 5, and a stream 6. If desired, the map 7 may be made in such a way that the vertical dimensions are exaggerated with reference to the horizontal dimensions as shown in Figure 2. The ridges or humps 2, 3 and the building 5 are still represented but their elevations are all proportionally increased and the stream 6 is represented but the depression between its banks is proportionally increased.

When the map has been produced, the sculptured face of the map is coated with a film of photographically sensitive material 8, as employed on camera films or plates or upon sensitized paper. After the exposure has been made, the picture is developed in the usual manner to fix it.

Suitable legends may then be applied to the map to indicate the names of towns, mountains, rivers, roads, or other useful information.

Models formed by the method described constitute valuable relief maps for military, commercial, civil and geographical purposes. If at any time changes in development of the terrain call for new editions of these relief maps, the surface images may be removed, the surface resensitized, and prints from later photographs and later information may be recorded on the surface of the original model by the method hereinbefore described. If extended areas are to be mapped by this process a series of rectangular blocks, covering say one square mile each, may be made and assembled at will to form a continuous relief map of all or any desired portion of the area covered.

It will be appreciated, of course, that the feature of exaggerating the vertical dimensions need not be employed, and that these dimensions may even be relatively diminished if desired.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. An aerial photograph having its picture bearing surface of uneven contour corresponding substantially with the contour of the territory and the objects which are photographically represented and having a vertical scale different from the horizontal scale.

2. A geographical relief map representative of physically measurable and visually observable conditions existing in a territorial area, said map having its vertical dimensions proportional throughout to actual elevations in the area with reference to a datum plane, the uneven surface of the map being a photograph of the area represented, and having suitable identifying or descriptive legends applied to supply information not observable from appearance and surface contour.

3. A geographical relief map comprising a rigid base having an uneven face the contour of which corresponds to the contour of the territory represented, and a photographic emulsion adhered directly to the uneven face of the base and there adapted to be exposed and developed to produce a picture of the territory represented with correspondence of images and contours.

4. A geographical relief representation of terrain comprising a rigid base having an uneven face, the contour of which corresponds to the contour of the terrain represented, and having a picture of the terrain represented comprising a thin film of photographic emulsion which has been exposed, developed and dried, adhered directly to the uneven face of the base with correspondence of images and contours between the picture and the base.

5. A photograph of terrain having a surface which corresponds at all points and in all relations of points in substantially exact quantitative manner in three dimensions with the form of the surface of terrain represented in such photograph.

6. Means for facilitating the study and measurement of an area of the earth's surface comprising a three dimensional model of a portion of said surface conforming with substantial accuracy to said surface to known horizontal and vertical scales whereby the spacial relationships of all objects represented may be determined by direct measurement of said model, the accuracy of said determined spacial relationships being independent of level or difference in level of said objects, said model bearing on its contoured surface a photographic representation of the terrain in registry with the contours of the surface.

7. A photograph of terrain recorded on a formed surface in such manner that the horizontal distance between the images of any two objects corresponds to a known scale with the horizontal distance between said two objects in nature and in which the vertical difference of height between the images of any two objects corresponds to a known scale with the vertical difference in height between said two objects in nature.

HEREWARD LESTER COOKE.